Nov. 13, 1962 F. R. YOUNGREN ETAL 3,063,654
RADOME WITH BORESIGHT ERROR REDUCTION MEANS
Filed Feb. 3, 1959 2 Sheets-Sheet 1

INVENTOR.
FRED R. YOUNGREN
MIKE W. FOSSIER
BY ROBERT O. HOWE

Arthur N. Collins
ATTORNEY

United States Patent Office 3,063,654
Patented Nov. 13, 1962

3,063,654
RADOME WITH BORESIGHT ERROR
REDUCTION MEANS
Fred R. Youngren, Bedford, Mike W. Fossier, Lexington, and Robert O. Howe, Bedford, Mass., assignors, by mesne assignments, to the United States of America as represented by the Secretary of the Navy
Filed Feb. 3, 1959, Ser. No. 790,988
4 Claims. (Cl. 244—14)

This invention relates to radomes and more particularly to radomes having means associated therewith for reducing the boresight error of a radome.

The placement of a radome or protective housing over the scanning dish of a radar apparatus introduces a boresight error or a transmission error into the incoming radar beam. This boresight error arises fom the fact that the incoming radar beam from a target is both attenuated and shifted in phase as it passes through the wall of the radome and is thus received by the scanning dish so as to result in an apparent angular displacement of the target relative to the dish. For any given radome, there is a specific or predetermined boresight error for each position of the scanning dish as it is moved through its range of scanning positions, and this boresight error will continuously undergo a specific rate of change in magnitude as the dish is moved through the scanning range. The boresight error of a radome and the rate of change thereof are important factors having a direct effect on the accuracy of a radar apparatus and will be determined for the most part by the shape of the radome and the material utilized in the construction thereof.

In the design of radomes for high speed objects such as supersonic missiles or supersonic aircraft, it is extremely desirable if not mandatory from an aerodynamic standpoint to utilize a long and pointed radome or a radome having a high-fineness ratio, i.e., a radome having a relatively large ratio of length to diameter. For a low drag and a consequent substantial increase in flight range, a radome having a high-fineness ratio is most advantageous; however, the use of such a shape has one critical disadvantage in that it results in a large change in boresight error as the radar beam is swept through the pointed nose portion of the radome. This large change in boresight error being most objectionable suggests the use of hemispherical-shaped radome inasmuch as it is well known that a hemispherical-shaped radome yields a much lower boresight error than a radome of any other configuration. A hemispherical-shaped radome on the other hand is also endowed with a pronounced aerodynamic disadvantage in that its use results in a severe loss in flight range at low altitudes. A radome suitable for use on high speed missiles or aircraft must therefore possess the advantages of both a hemispherical-shaped radome and a radome having a high fineness ratio.

The present invention contemplates a radome construction which is endowed with the advantages of a hemispherical-shaped radome and is also suitable from an aerodynamic standpoint. The preferred embodiment of the invention is characterized by a long and pointed radome carried on the fore end of a missile and housing a radar apparatus including a gimbal-mounted scanning dish. A hollow dielectric member is carried on the inner periphery of the radome and is positioned within the pointed nose portion thereof intermediate the fore end of the radome and the scanning dish. The dielectric member functions to produce a boresight shift in the radome within certain gimbal angles or within a predetermined range of movement of the scanning dish by attenuating and shifting the phase of one side of the incoming radar beam. This boresight shift is of an opposite sign from that already present in the radome within this range of movement of the scanning dish and thereby results in a greatly reduced boresight error for the combination.

Accordingly, one object of the present invention is to reduce the boresight error of a radome.

Another object of the invention is to achieve the boresight error of a hemispherical radome while using a radome having a shape suitable for aerodynamic considerations.

Another object of the invention is to permit the use of a radome having a high-fineness ratio in high-speed missiles or the like.

These and other objects of the invention will become readily apparent to those skilled in the art from the following detailed description of a preferred embodiment of the invention taken in connection with the accompanying drawings, wherein.

Figure 1:
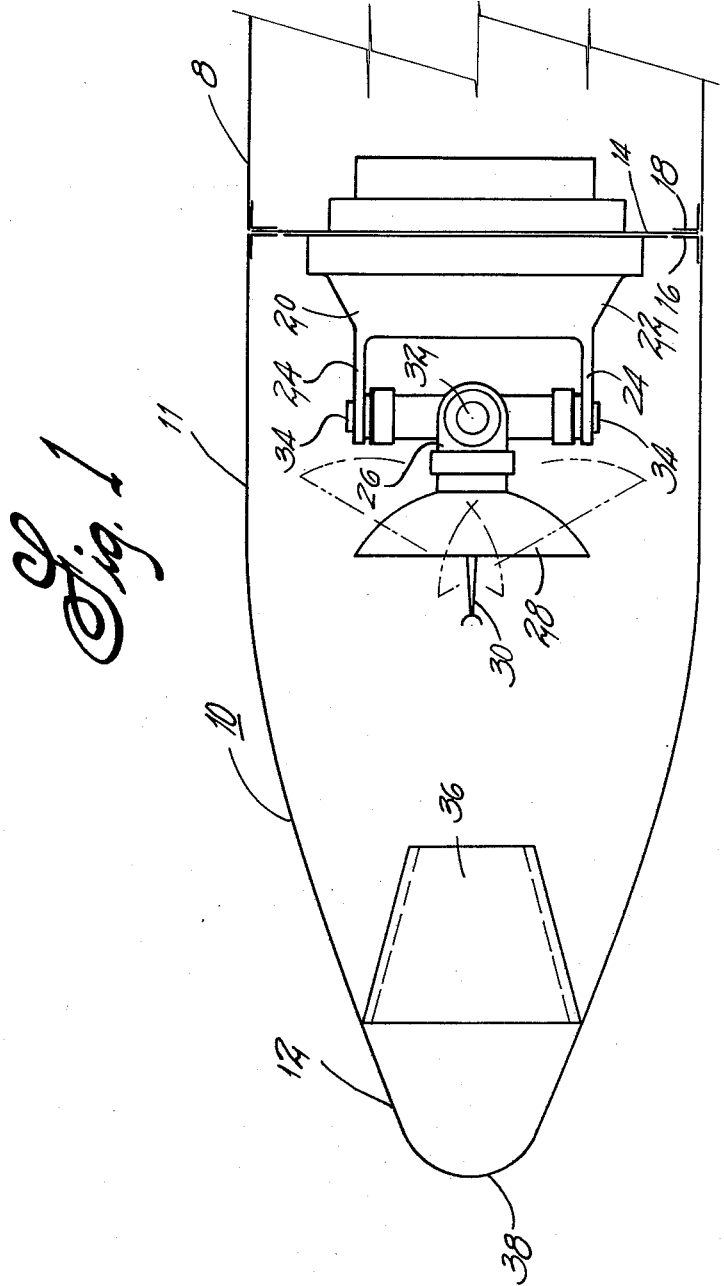
FIG. 1 is a schematic illustration of the invention embodied in the nose assembly of a missile.

Referring more particularly to the drawings, FIG. 1 shows a nose assembly for a high speed missile or the like including a forward housing portion 8 to which is attached an elongated radome means or radome 10 having a body portion 11 and a pointed nose portion 12. The housing 8 and radome 10 are both substantially circular in cross-section (not shown) with the radome having in this specific instance a fineness ratio or a ratio of length to maximum diameter of approximately 2:1. The radome 10 is rigidly connected to the housing portion 8 of the missile by means of a substantially circular plate or bulkhead 14 to which is connected by any suitable means (not shown) a pair of substantially circular L-shaped channels or brackets 16 and 18. The outer peripheries of brackets 16 and 18 are connected to the housing 8 and radome 10, respectively, by any suitable means (not shown) and the two brackets not only serve to hold the housing 8 and radome 10 in assembled engagement but also to maintain the two components in axial alignment.

A detection means or radar apparatus, generally designated by the reference numeral 20, is carried by the bulkhead 14 and extends substantially longitudinally of the enclosing radome 10. The radar apparatus 20 includes a housing or casing 22, pairs of gimbal arms 24—24 and 26—26 (only one arm 26 shown), a scanning dish or reflector 28 and an antenna 30, the reflector 28 and antenna 30 being constructed as a unit and as shown in the drawing assuming a position wherein their longitudinal axes coincide with the longitudinal axes of the radome 10. The reflector 28 is connected to gimbal arms 26—26 for rotary scanning movement about the axis of a shaft 32 and gimbal arms 26—26 are in turn operatively connected to gimbal arms 24—24 for rotation about the axis of a shaft 34 carried thereby, the axis of shaft 34 being normal to the axis of shaft 32. Being so mounted, the scanning dish 28 is capable of being rotated about two intersecting axes spaced 90° apart and is thus capable of both a pitching movement (rotation about shaft 32) and a yawing movement (movement about shaft 34) or a combination of both, some of the various pitching positions of the scanning dish 28 being shown in dotted lines in the drawing. Mechanism for imparting movement to the gimbal-mounted scanning dish 28 is carried within the housing 22 of the radar apparatus and for the sake of brevity will not be described herein inasmuch as radar apparatuses and the construction thereof are well known in the art and per se form no part of the present invention.

A dielectric means or dielectric member 36 is carried within the radome 10 and herein takes the form of a hollow substantially frusto-conical shaped member positioned within the pointed nose portion 12 of the radome with the small end aft. The dielectric member 36 is attached to the inner periphery of the radome nose portion 12 with its axis of symmetry substantially coinciding with the longitudinal axis of the radome 10 and is located within the nose portion 12 at a predetermined or fixed position intermediate the fore end 38 of radome 10 and the scanning dish 28, the exact or predetermined position to be occupied by the dielectric member to be discussed more in detail hereinafter.

Figure 2:
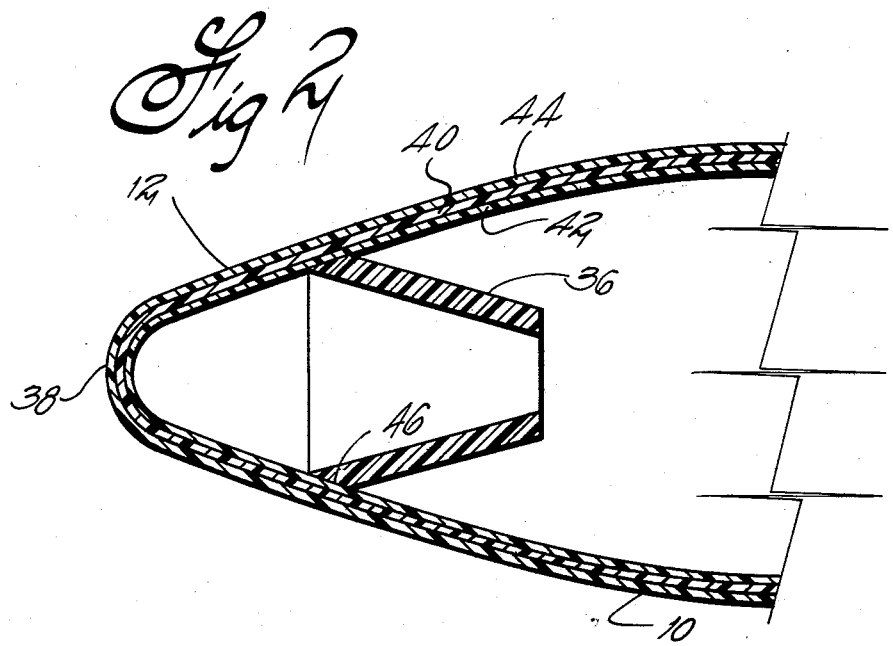
FIG. 2 is a fragmentary longitudinal section through the preferred embodiment of the radome and dielectric member carried thereby.

Referring to FIG. 2 and the preferred structural embodiment of the invention, the radome 10 is shown as a 3 ply laminated construction comprised of a tri-diisocyanate inner ply member 40 sandwiched between a pair of outer ply members 42 and 44 made of fiberglass. This particular combination of materials has been found to provide satisfactory results when utilized for the construction of radomes due to its structural rigidity and capability of being permeated by radar or micro-wave energy, although it will be apparent to those skilled in the art that many other materials or combinations of materials could be satisfactorily utilized in place thereof. The frusto-conical shaped dielectric member 36 is also in this instance made of tri-diisocyanate foam and is attached or secured to the plexiglass inner periphery of the radome nose portion 12 with the fore or larger end thereof being beveled or angularly formed at 46 to provide a tight mechanical interfit between the parts. Any suitable adhesive may be utilized to anchor or bond the beveled surface 46 to the plexiglass inner periphery of the nose portion 12 and thereby rigidly fix the dielectric member 36 in position within the radome 10. While tri-diisocyanate foam has been herein illustrated as the preferred material comprising the dielectric member 36, it will be appreciated that any other dielectric material could also be employed provided that adjustments are made in the amount of the material so employed to compensate for the dielectric constant thereof.

In the operation of the radar apparatus, the function of the dielectric member 36 is to provide an obstruction to the incoming radar beam and thereby produce an apparent angular displacement of the target relative to the scanning dish. For instance, when the scanning dish 28 is rotated by the gimbals to some small angle away from the radome axis of symmetry or longitudinal axis, the dielectric member 36 will obstruct the incoming radar beam; however, due to the particular shape and location of the dielectric member, the obstruction afforded thereby will not be symmetrical with respect to the axis of the scanning dish 28. This unsymmetry will in turn cause greater attenuation and phase shift to the side or lobe of the radar beam which is obstructed by the dielectric member and the phase shift and attenuation thus produced will result in a boresight shift for this particular position of the scanning dish 28 or an incremental boresight error. By properly shaping the dielectric member 36 and carefully locating same in a predetermined position within the radome 10, this incremental boresight error can be made of an opposite sign and magnitude from the boresight error normally present in the radome 10, thus resulting in a greatly reduced boresight error for the combination radome 10 and dielectric member 36.

Figure 3:
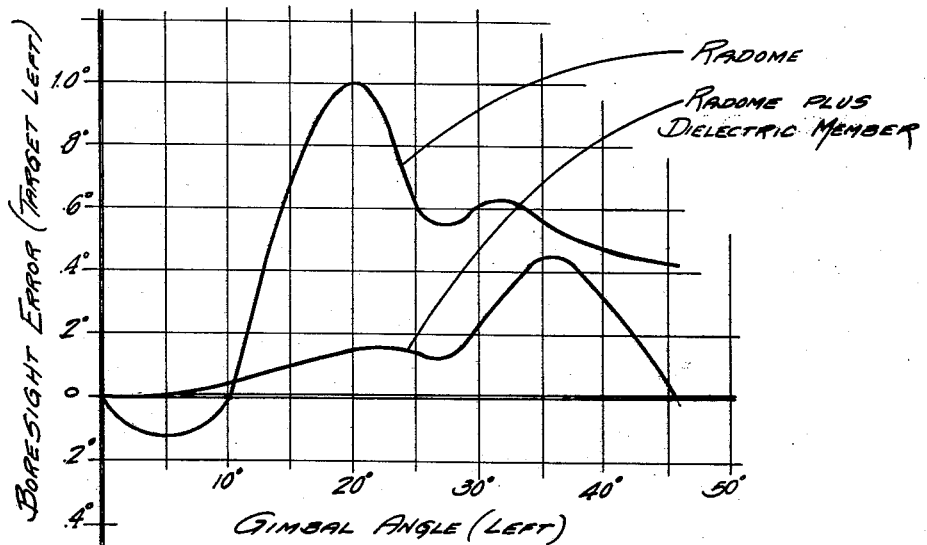
FIG. 3 is a graphical representation of the reduction in boresight error afforded by the present invention.

FIG. 3 shows a graphical analysis of tests conducted on a high-fineness ratio radome constructed in accordance with the preferred embodiment of the invention with the radome performance being evaluated with and without the insertion of the dielectric member. Values of gimbal angle or scanning dish position were plotted against boresight error. Viewing this graph, it can readily be seen that the use of the dielectric member results in a substantial reduction in boresight error at moderate gimbal angles or angles varying between 0°–45°. It will be especially noted that the use of the dielectric member effects a significant reduction in the rate of change of boresight error between the angles of 0° and 25°, the incremental boresight error thus experiencing very little change when the scanning dish is rotated through small angles away from the axis of symmetry of the radome.

Referring again to FIGS. 1 and 2, it should be pointed out that the dielectric member 36 need occupy no single or sole predetermined position within the pointed nose portion 12 of the radome 10 in order to effect a reduction in boresight error. In fact, the dielectric member 36 can be placed at any desired position within the radome 10 to effect a change in boresight error but it will be much more effective in operation if placed in a predetermined position where it produces the greatest reduction in boresight error within a certain scanning range of the scanning dish. The exact or predetermined position of the dielectric member 36 to be selected in any given instance will be determined for the most part by the particular material or materials utilized in the construction of the radome, the shape and dimensions of the radome, the total range of movement of the scanning dish within the radome, and the specific or limited range of movement of the scanning dish wherein the boresight error rate of the radome is the greatest. In essence, it is the result desired to be obtained by the use of the dielectric member that ultimately determines its exact position within the radome.

Similarly, it should also be pointed out that the dielectric member 36 need have no specific shape or dimensions to be capable of effecting a boresight reduction. Again, the selection of a specific shape and specific dimension will be determined for the most part by the specific results it is desirable to obtain in any given radome. A hollow, frusto-conical shaped radome as utilized in the preferred embodiment of the invention has been found to perform very satisfactorily in radomes having a relatively high fineness ratio.

While a single and hollow dielectric member having a frusto-conical shape has been shown and herein described in connection with the preferred embodiment of the invention, it is furthermore noteworthy to mention that the present invention also contemplates the use of more than one dielectric member in combination with a radome. Depending upon the design and construction of any given radome and the specific results desirable to obtain therefrom, two or more dielectric members of any given shape and dimensions and made of the same or different materials could be placed in the radome at separate and predetermined positions.

In addition to the use of more than one dielectric member, it will also be obvious to those skilled in the art that many modifications and variations of the present invention are possible in light of the above teachings. It is therefore to be understood that within the scope of the appended claims the invention may be practiced otherwise than as specifically described.

What is claimed is:

1. A nose assembly for a high speed object such as a missile or the like comprising a radar apparatus carried by said high speed object and including a reflector and antenna movable between a plurality of scanning positions, an elongated radome carried by said high speed object on the forward end thereof and being operable to house said radar apparatus, and a hollow, substantially frusto-conical shaped member carried within said radome between said radar apparatus and the fore end of said radome for effecting a boresight shift in an incoming radar beam to thereby reduce the boresight error of said radome as said reflector and antenna are moved through said plurality of scanning positions.

2. A nose assembly as claimed in claim 1 wherein said hollow, substantially frusto-conical shaped member is made of a dielectric material and is attached to the inner periphery of said radome with the small end thereof aft of said radome.

3. A nose assembly as claimed in claim 2 wherein said hollow, substantially frusto-conical shaped member is positioned in said radome a predetermined distance from the fore end of said radome.

4. A nose assembly as claimed in claim 2 wherein the dielectric material utilized in the construction of said hollow, substantially frusto-conical shaped member is comprised of tri-diisocyanate foam.

References Cited in the file of this patent
UNITED STATES PATENTS

| | | |
|---|---|---|
| 2,854,668 | McMillan | Sept. 30, 1958 |
| 2,928,092 | Hatch | Mar. 8, 1960 |